(12) United States Patent
Song et al.

(10) Patent No.: US 6,234,526 B1
(45) Date of Patent: May 22, 2001

(54) HEAD IMPACT PROTECTION USING FLUID VISCOSITY

(75) Inventors: Seung-Jae Song, Novi; Eugene M. Schoenherr, Shelby Township; Stephen P. Gierak, Rochester Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/406,589

(22) Filed: Sep. 27, 1999

(51) Int. Cl.$^7$ .................................................. B60R 21/04
(52) U.S. Cl. .............................................................. 280/751
(58) Field of Search ................................................. 280/751

(56) References Cited

U.S. PATENT DOCUMENTS

| 5,098,124 | 3/1992 | Breed et al. .................... 280/751 |
| 5,141,279 | 8/1992 | Weller ............................. 296/146.5 |
| 5,356,177 | 10/1994 | Weller ................................. 280/751 |
| 5,564,535 | * 10/1996 | Kanianthra ........................... 280/751 |
| 5,649,721 | 7/1997 | Stafford et al. ...................... 280/751 |
| 5,749,193 | 5/1998 | Bucher et al. ................... 52/506.06 |
| 5,823,611 | 10/1998 | Daniel et al. ........................ 296/214 |
| 5,851,626 | 12/1998 | McCorry et al. ...................... 428/95 |

* cited by examiner

Primary Examiner—Kenneth R. Rice
(74) Attorney, Agent, or Firm—Mark P. Calcattera

(57) ABSTRACT

An energy absorbing member for use in an automobile to absorb occupant impact forces. The energy absorbing member includes a hollow membrane defining a cushion with a plurality of chambers. The membrane includes walls defining the chambers and orifices hydraulically interconnecting the plurality of chambers to equalize fluid pressure within each of the chambers and dissipate impact forces acting on the membrane by conveying fluid between the plurality of chambers when the energy absorbing member is moved from an initial state to a collapsed state. The cushion contains a constant amount of fluid as the energy absorbing member is moved from the initial to collapsed states.

7 Claims, 2 Drawing Sheets

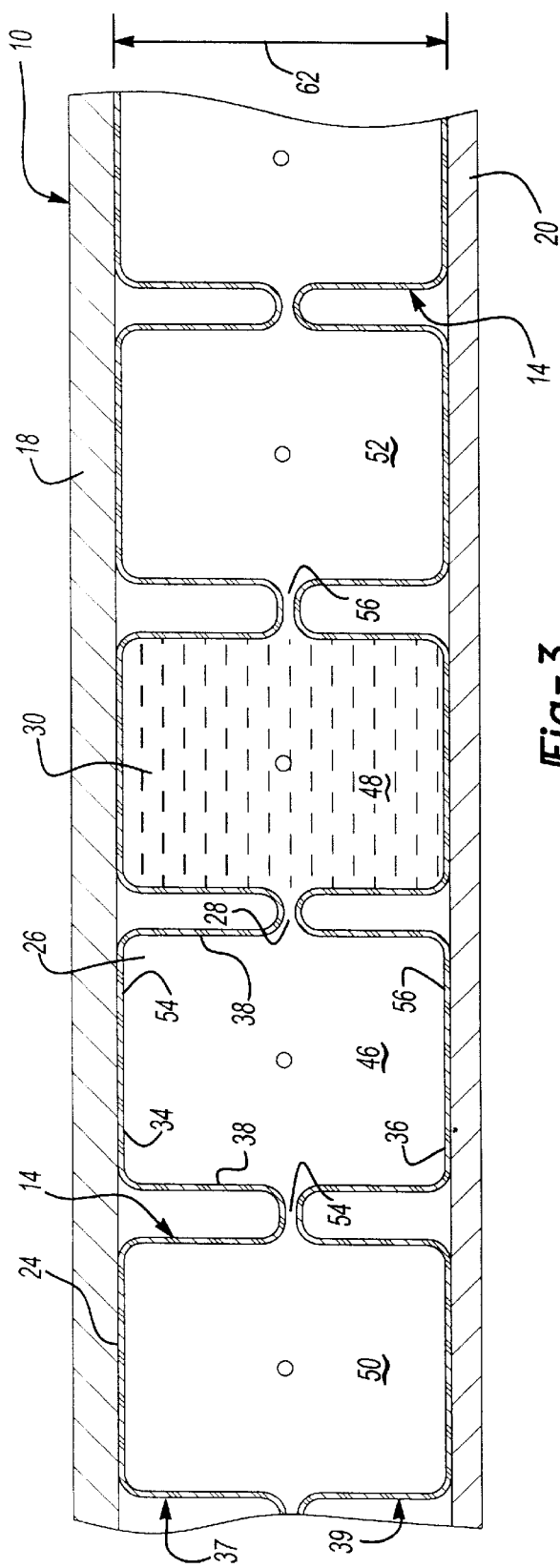
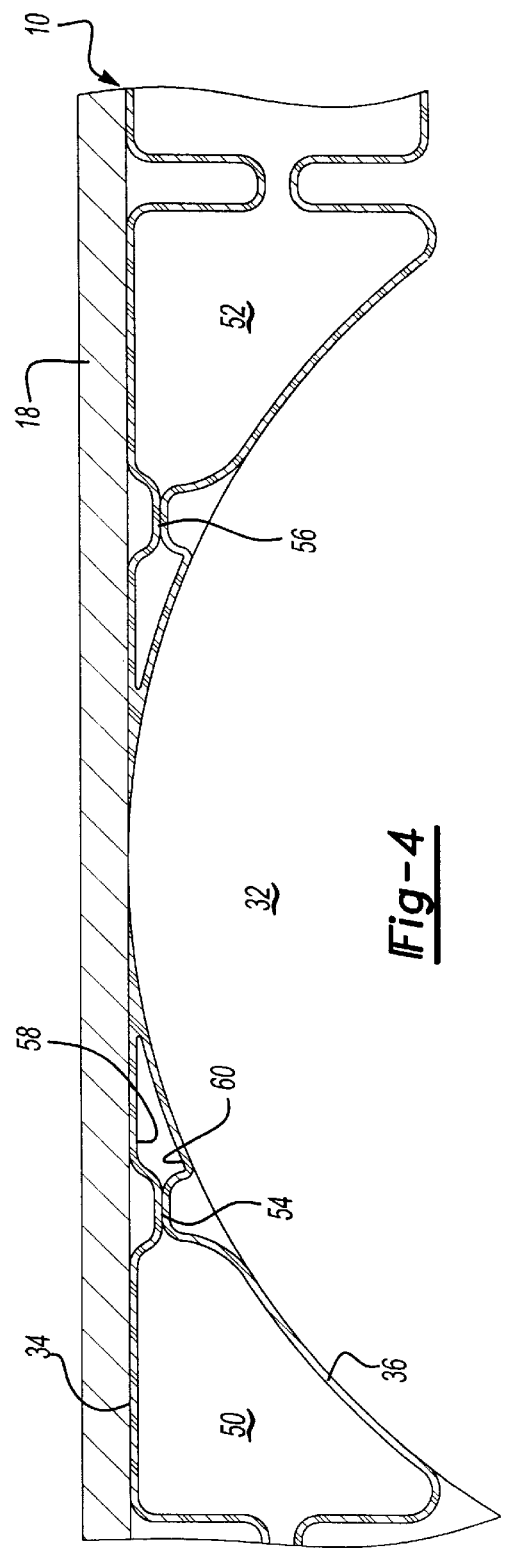

HEAD IMPACT PROTECTION USING FLUID VISCOSITY

BACKGROUND OF THE INVENTION

Field of the Invention

The present invention relates generally to energy absorbing measures for vehicles, and more particularly to an energy absorbing structure using fluid viscosity to absorb forces generated due to occupant impact with the upper interior of a vehicle.

BACKGROUND AND SUMMARY OF THE INVENTION

Currently, automobiles and other vehicles are equipped with a variety of safety devices designed to protect the vehicle driver and passengers from injury resulting from vehicle crashes. Such equipment includes impact absorbing material mounted to the interior of the passenger compartment or cockpit of the vehicle. This impact absorbing material is commonly positioned in various locations throughout the cockpit including on the A-pillar, B-pillar, rear pillar, doors, and roof panel. The design and location of the impact absorbing material within the cockpit may vary depending upon applicable standards and the portion of the occupant's body intended to be protected by the material.

A variety of impact absorbing measures are commonly used in the art including numerous types of foam panels, honeycombed and other shaped collapsible structures, as well as cushions containing fluid, air, or gel-filled chambers with structure for discharging the fluid upon impact For example, U.S. Pat. No. 5,098,124 to Breed et al. discloses a padding having isolated air-filled chambers with an orifice to discharge the air upon impact and provide energy absorbing damping to protect an occupant during impact. Each of the cells collapse more or less independently as the air is discharged out of each cell through a flow restrictor communicating with each chamber. The device also includes a mechanism such as a spring for restoring the chamber to its initial position following impact. While this device may provide certain advantages, it does not fully utilize the dampening and restoration effects of fluid flow between chambers.

A somewhat similar impact apparatus is disclosed in U.S. Pat. No. 5,141,279 to Weller. This apparatus includes a cushion formed of a flexible skin having a rupturable diaphragm covered orifice or extrudable elastomeric plug that is adapted to discharge fluid, water or gel contained within the skin upon impact. The contained fluid is discharged into a separate reservoir or into the door cavity. As a result, this device again fails to take full advantage of the dampening effects of interconnected chambers through the viscosity of the fluid. Moreover, by discharging all or a portion of the contained fluid, the device is not self-rejuvenating through redistribution of the fluid after impact.

As a final example of the deficiencies in the prior art, reference is made to U.S. Pat. No. 5,356,177 to Weller. In this impact apparatus, an orifice is formed in each cell to communicate air between the impacted cells and adjacent cells. The air flow between the cells is dependent upon the pressure differences therebetween. Again, the apparatus of the '177 patent includes orifices for discharging the air from the side walls of the outer cells of the cushion to atmosphere.

Recently, the United States government has enacted specific requirements relating to the protection of the vehicle occupant during a crash and, more particularly, to the performance of inpact absorbing measures subjected to free motion head form (FMH) impact at fifteen miles per hour.

While previously developed impact absorbing material has provided adequate impact protection to date, the new Federal Standards do require more capable measures. Specifically, impact absorbing measures are needed that satisfy the Federal Regulations, are easy to manufacture, and lightweight.

In view of the above, it is an object of the present invention to provide an impact protection material having a cushion containing a constant amount of fluid that is distributed between interconnected chambers to absorb impact energy as the material is moved from an initial state to a collapsed state.

It is a further object of the present invention to provide an energy absorbing member that generates a reaction force that is proportional to the impact velocity.

It is yet a further object of the present invention to provide an energy absorption material that utilizes the viscosity of a fluid or gel within chambers defined by the cushion to effectively protect a vehicle occupant from injuries resulting from various impact speeds.

It is still another object of the present invention to provide an energy absorption material of a fluid type that is non-destructive and therefore functional through multiple collisions and that can be used in combination with other protection measures including those presently existing in the art to afford even greater protection to the vehicle occupant.

In accordance with the broad teachings of this invention, an impact protection material for use in an automobile cockpit having a beneficial construction and configuration is provided. More particularly, in one embodiment of the present invention, the energy absorbing member includes a membrane defining a hydraulically closed cushion with a plurality of chambers. The membrane includes walls defining the chambers and orifices hydraulically interconnecting the plurality of chambers to equalize fluid pressure within each of the chambers and dissipate impact forces acting on the membrane by conveying fluid between the plurality of chambers when the energy absorbing member is moved from an initial state to a collapsed state. The closed cushion contains a constant amount of fluid as the energy absorbing member is moved from the initial to collapsed states.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a cross-sectional view taken along the line 3—3 shown in FIG. 2; and

FIG. 4 is a sectional view similar to that shown in FIG. 3 with the energy absorbing member in a collapsed state.

DETAILED DESCRIPTION OF THE PREFERRED EMBODIMENTS

Figure 1:
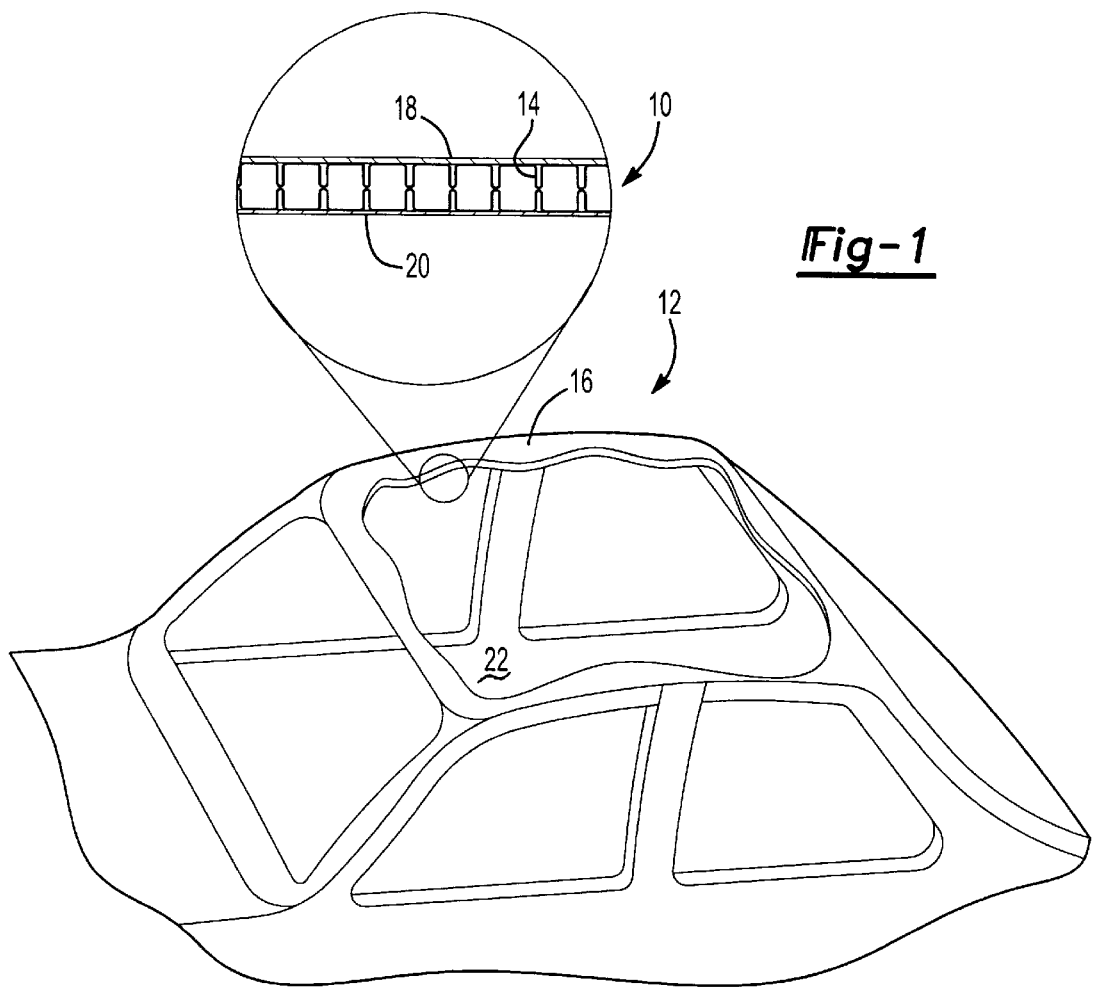
FIG. 1 is a perspective view of a cockpit of a motor vehicle with a portion of the roof cut away and enlarged to illustrate the energy absorbing member.

The following description of the preferred embodiments of the present invention is merely exemplary in nature and is in no way intended to limit the invention, its applications, or uses. As generally shown in FIG. 1, the present invention relates to an energy absorbing assembly 10 for use in an automobile body 12. More particularly, in the embodiment illustrated in FIGS. 1–3, energy absorbing assembly 10 includes an energy absorbing member 14 positioned to provide head impact protection along the roof panel 16 of the vehicle and is coupled between the base metal 18 of the roof and the inner upholstery 20. It should be appreciated that the energy absorbing member of the present invention may be used in other positions within the vehicle cockpit 22 such as along the doors, pillars, etc., to protect the vehicle occupant during collisions. Moreover, the present invention may also be used in other applications where its benefits and performance characteristics provide desirable results.

Figure 2:
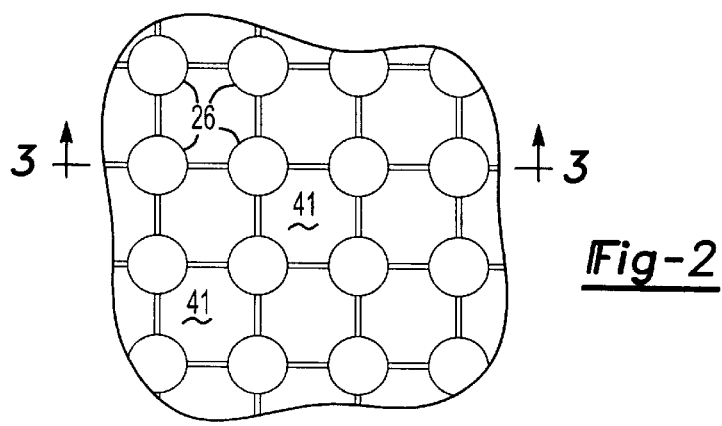
FIG. 2 is a plan view of a portion of the energy absorbing member shown in FIG. 1.

Referring to FIGS. 1–3, energy absorbing member 14 includes a membrane 24 that defines a cushion hydraulically isolated from the surrounding environment and having a plurality of chambers 26 hydraulically interconnected by orifices 28. As will be discussed in greater detail below, the cushion contains a predetermined and constant amount of fluid, indicated with reference to chamber 48 by reference numeral 30, that is conveyed between chambers through the orifices based upon pressure differences within the individual chambers. More particularly, the cushion does not include a rupturable diaphragm or dischargeable plug for discharging the fluid from the cushion at a predetermined pressure. Accordingly, when the membrane 24 is subjected to an impact force such as by head form 32, the impact force increases the pressure within the chambers most closely proximate to the impact. The pressure differences force fluid to flow from the impacted chambers through the orifices to more remote chambers thereby dissipating the impact forces. The viscosity of the fluid flowing through the restrictive orifices from the higher pressure impacted cells to the non-impacted or lesser impacted cells cushions the impact of the head form 32 on the base metal 18 and protects the head form from injury. Upon removal of the impact forces, the pressure within the hydraulically interconnected chambers returns to the equilibrium pressure prior to impact due to the closed nature of the cushion.

In the preferred embodiment of the present invention, the fluid is a liquid or gel having a freezing temperature lower than the normal operating temperature of a motor vehicle in order to provide consistent performance over the operating temperature range. Additionally, it is preferred that the fluid have a relatively low density to decrease the overall weight of the energy absorbing assembly 10. Presently, it is anticipated that a variety of fluids may be used to satisfy these criteria. Further, membrane 24 is preferably formed of a flexible, non-porous rubber or vinyl like material through blow molding or other manufacturing techniques commonly used in the art for such applications. The configuration of the chambers and other parameters, such as the wall thicknesses, material, chamber compressive strengths, chamber size, and orifice size, may be varied for the particular application so as to achieve maximum energy absorption within the available space.

In the illustrated embodiment, the membrane 24 is configured to include top and bottom chamber end walls 34 and 36, respectively, and side walls 38 each having sufficient strength to resist significant deformation on impact. The resistance of the membrane 24 to deformation maximizes pressure build-up within each chamber 26 thereby increasing the energy dissipation capabilities of the assembly. While a cylindrical configuration for each of the chambers 26 is illustrated in the drawings and described herein, the invention is not limited to a specific chamber design shown but rather that a variety of chamber configurations may be used. Notwithstanding the general applicability of the present invention, it is specifically preferred that the membrane 24 be formed of a top formed sheet 37 and a bottom formed sheet 39 sealingly coupled to one another in the areas 41 (FIG. 2) between adjacent chambers and orifices such as via an adhesive or by heat bonding the respective sheets to one another. This configuration provides added strength to the membrane, reducing the likelihood that the chambers will rupture and fluid will escape.

The energy absorbing assembly 10 provides an impact cushioning device that effectively absorbs impact energies at early stages of impact as well as for low and high velocity impacts. More particularly, prior to impact when the member 14 is in its initial or non-impacted state (FIG. 3), the fluid in each chamber 26 has the same pressure, preferably atmospheric pressure, due to the equalizing effects of orifices 28. When head form 32 impacts the energy absorbing assembly 10, the member 14 is placed in an impacted state wherein the fluid pressure within the impacted chambers, such as chambers 46 and 48, quickly increase above the equilibrium pressure. The increased pressures force fluid to flow from the impacted chambers 46 and 48 to the non or lesser impacted chambers such as chambers 50 and 52, through orifices 54 and 56. The rate at which the pressure rises and the peak pressure in impacted cells 46 and 48 is dependent upon the velocity of impact and the mass of the head form 32. Accordingly, for higher velocity impacts, the pressure within the impacted cells rises more rapidly and to an even greater magnitude so that the cushion creates greater reaction forces against the head form as the pressure is dissipated through the constant flow area orifices 54 and 56. As the impact velocity decreases, the pressure differentials within the chambers and the resulting fluid flow rate also decrease. As a result, the cushioning effect of the energy absorbing member 14 varies with the impact velocity. Thus, the assembly 10 is effective in a variety of "real world" impact conditions where prior devices were most effective only at test conditions.

Another benefit of the present invention is that the closed cushion contains a constant amount of fluid allowing the energy absorbing assembly to effectively rebound after impact and to provide repeating protection in a non-destructive manner. More particularly, after the impact force is removed, the fluid again seeks its equilibrium pressure to equalize the pressure within each of the individual chambers. This nondestructive feature of the energy absorbing member allows the apparatus to effectively cushion the occupant through more than one collision.

The performance of the energy absorbing member 14 is dependent upon a variety of factors including fluid viscosity, orifice flow areas, membrane strength, etc. These factors, particularly the orifice flow area, may be selected for maximum performance at any specific or range of impact velocities. For example, one or more of the factors may be varied prior to installation of the member 14 to effectively tune the impact absorbing characteristics of the energy absorbing member and provide energy absorbent characteristics that satisfy a variety of requirements. Specifically, smaller flow area orifices provide a stiffer feel capable of absorbing relatively high velocity inpacts.

In order to maximize the benefits of the assembly 10 in low and high velocity collisions, the member may be designed so that a predetermined impact condition may cause the absorbing member to fully collapse as shown in FIG. 4. Specifically, when the head form 32 impacts the energy absorbing assembly 10 at a sufficient velocity, the impacted cells fully collapse such that the inner surfaces 58 and 60 of the top and bottom walls 34 and 36, respectively, contact one another without fully absorbing all of the kinetic energy of the head form. In such circumstances, as shown in FIG. 4, the full collapse of the impacted chambers under the maximum design load allows full utilization of the thickness 62 of the energy absorbing member 14 while providing cushioning of the occupant during relatively low velocity crashes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An energy absorbing member for use in a vehicle to absorb occupant impact, said energy absorbing material comprising:

a hollow membrane defining a cushion having a plurality of chambers, said membrane formed of a top formed sheet and a bottom formed sheet sealingly coupled to one another, and said membrane having walls defining said plurality of chambers and orifices hydraulically interconnecting said plurality of chambers to equalize a fluid pressure within each of said plurality of chambers and dissipate impact forces on said membrane by conveying a fluid between said plurality of chambers when said membrane is moved from a non-impacted state to an impacted state, said cushion containing a constant amount of fluid as said membrane is moved from said non-impacted state to an impacted state.

2. The energy absorbing member of claim 1 wherein each of said plurality of chambers has a top wall, a bottom wall and a cylindrical side wall interconnecting said top and bottom walls, each of said side walls having an orifice formed therein.

3. The energy absorbing member of claim 2 wherein said orifice of each of said side walls is spaced an equal distance from said top wall and said bottom wall thereof.

4. An energy absorbing assembly for use in a vehicle, said energy absorbing assembly adapted to absorb an impact force generated when the vehicle occupant impacts the assembly, said energy absorbing assembly comprising:

a fluid; and an energy absorbing member adapted to collapse from an initial state to a collapsed state, said energy absorbing member including a hollow membrane defining a cushion with a plurality of chambers, said membrane formed of a top formed sheet and a bottom formed sheet sealingly coupled to one another, said fluid disposed in said cushion, said membrane having walls defining said chambers and orifices hydraulically interconnecting said plurality of chambers to equalize a fluid pressure within each of said plurality of chambers and dissipate impact forces on said membrane by conveying said fluid between said plurality of chambers when said energy absorbing member is moved from said initial state toward said collapsed state, said cushioning containing a constant amount of said fluid as said energy absorbing member is moved from said initial state to said collapsed state.

5. The energy absorbing assembly of claim 4 wherein each of said plurality of chambers has a top wall, a bottom wall and a cylindrical side wall interconnecting said top and bottom walls, each of said side walls having an orifice formed therein.

6. A vehicle comprising:

a body panel;

an interior finish member coupled to said body panel to define a cavity between said body panel and said interior finish member; and an energy absorbing assembly disposed in said cavity and coupled to said body panel, said energy absorbing assembly including a hollow membrane defining a cushion with a plurality of chambers, said membrane formed of a top formed sheet and a bottom formed sheet sealingly coupled to one another, and said membrane having walls defining said chambers and orifices hydraulically interconnecting said plurality of chambers to equalize the pressure of a fluid contained within each of said plurality of chambers and dissipate impact forces on said membrane by conveying said fluid between said plurality of chambers when said energy absorbing member is moved from said initial state toward said collapsed state, said cushion containing a constant amount of said fluid as said energy absorbing member is moved from said initial state to said collapsed state.

7. The vehicle of claim 6 wherein each of said plurality of chambers has a top wall, a bottom wall and a cylindrical side wall interconnecting said top and bottom walls, each of said side walls having an orifice formed therein.

* * * * *